Figure 1:
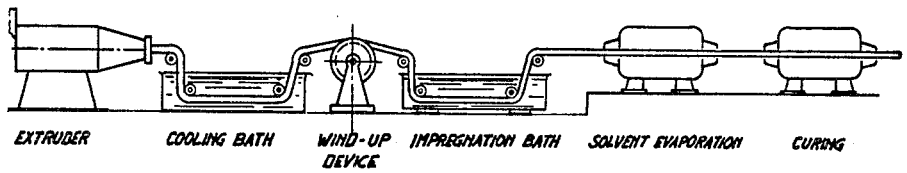

Aug. 3, 1965  G. PEDRETTI ETAL  3,198,868
PROCESS FOR VULCANIZING PRE-SHAPED ARTICLES FORMED FROM
VULCANIZABLE POLYMERIC MATERIALS
Filed July 15, 1960

INVENTOR.
Giovanni Pedretti
Luigi Corbelli

United States Patent Office 3,198,868
Patented Aug. 3, 1965

3,198,868
PROCESS FOR VULCANIZING PRE-SHAPED
ARTICLES FORMED FROM VULCANIZABLE
POLYMERIC MATERIALS
Giovanni Pedretti and Luigi Corbelli, Ferrara, Italy, assignors to Montecatini Società Generale per l'Industria Mineraria e Chimica, Milan, Italy
Filed July 15, 1960, Ser. No. 43,048
Claims priority, application Italy, July 17, 1959,
11,963/59
4 Claims. (Cl. 264—347)

This invention relates to a process for vulcanizing shaped articles made from vulcanizable natural and synthetic rubbery materials, in which process the vulcanizing agent is incorporated with the vulcanizable rubbery material by impregnating the manufactured shaped article therewith.

In the various working stages of the rubbery materials, such as mixing, extrusion, roll mixing, and molding, it is often preferred, for various reasons to operate at temperatures as high as possible and limited only by the resistance of the elastomer to degradation by heat.

However, when vulcanizing agents are mixed with the rubbery materials prior to the manufacture of the shaped articles, temperatures in excess of 100–120° C. often result in scorching of the articles and have to be avoided for that reason. This is obviously a serious limitation. For example, in order to extrude the rubbery materials satisfactorily at the low temperatures mentioned, it is necessary to add large amounts of fillers which facilitate the extrusion, to the rubbery material.

One object of the present invention is to provide a process which eliminates the aforementioned disadvantages and which makes it possible to carry out the various operations of mixing and shaping the rubbery materials at temperatures as high as possible and at which working of the starting rubbery substances can be carried out most conveniently.

This and other objects are attained by the process of this invention according to which the rubbery substance is formed into a manufactured article of definite shape, cooled, and immersed in a bath of a suitable organic peroxide dissolved in acetone or alcohol (about 20 to 100 g. peroxide in 1 liter solvent).

The immersion time in the organic peroxide solution varies from about 1 hour to some days, depending on the thickness of the manufactured article and on the bath temperature (30–50° C.). During the immersion, the peroxide, i.e., the vulcanizing agent, penetrates by diffusion the whole volume of the shaped article and, at the equilibrium, there is a definite ratio between the concentration of the peroxide diffused in the rubber and that in the solvent.

The manufactured article is then withdrawn from the bath and is placed for some hours in an oven under vacuum at about 40–50° C., in order to evaporate the small amount of absorbed solvent. It is then placed in an autoclave, and finally in a press for vulcanization at a temperature comprised in general between 100° C. and 220° C., depending on the peroxide used.

The process of this invention can be used successfully for all elastomers which can be vulcanized with the aid of organic peroxides, such as natural rubber, styrene rubber, butyl rubber, silicone rubber, etc., but is of particular and substantial advantage when it is applied to the linear, amorphous copolymers of ethylene with alpha-olefins $CH_2=CHR$ where R is hydrocarbon as disclosed by Natta et al., or to mixtures of such a copolymer with natural and/or synthetic rubber, or with elastomers obtained from olefin homopolymers including polyethylene and the homopolymers of alpha-olefins $CH_2=CHR$ as disclosed by Natta et al., and which mixtures contain at least 5 to 10% of a linear, amorphous ethylene-propylene copolymer.

In practicing this invention any organic peroxide can be used, provided it is at least partially soluble in liquids which do not swell the rubbers, such as acetone, diethyl ketone, methyl alcohol, ethyl alcohol, etc.

The linear, amorphous copolymers of ethylene with alpha-olefins and, more particularly, such linear, amorphous copolymers of ethylene with propylene or with butene, are disclosed in the pending application of Natta et al. Ser. No. 629,085 filed December 18, 1956.

Vulcanized elastomers from said linear, amorphous copolymers have also been disclosed by Natta et al. Said copolymers, and the vulcanized products obtained from them, are completely new in the art and differ from the conventional copolymers and elastomers in both their structural and their physico-chemical characteristics.

We have found that, surprisingly, the linear amorphous copolymers of ethylene with alpha-olefins, and the mixtures containing at least 5% by weight of such copolymers, can be successfully vulcanized after shaping thereof, by the present method in which the vulcanizing agent is incorporated in the copolymer or mixture by impregnating the shaped article with it. The copolymer or mixture comprising it which is shaped can be mixed with the usual fillers and may also be mixed with sulfur in amounts varying from 0.1 to 3% calculated on the weight of the mix or preferably in a concentration of from 0.1 to 3.0 gram atoms of sulfur per mole of peroxide.

The copolymers used in the present process have a molecular weight of 50,000 to 500,000, preferably from 80,000 to 180,000, and contain from 40 to 65 mol percent of propylene or butene in the copolymer molecule.

The present process and the advantages thereof are illustrated in the following examples with reference to the production of specific articles such as electric cables, pipes, yarns, etc. However, these examples are not intended to be limiting since outstanding advantages are obtained in the vulcanization of any article formed from or containing the linear, amorphous copolymers of ethylene with the alpha-olefin $CH_2=CHR$.

EXAMPLE 1

*Preparation of electric cables.*—The cables for the transportation of electric power have an insulating sheath which can consist of an elastic or of a plastic material. The elastic materials which may be used to form the sheath include vulcanized rubbers such as natural rubber, butadiene-styrene copolymer rubber, butyl rubber, silicone rubber and ethylene-propylene copolymer rubber. The plastic materials which can be used include polyethylene, polypropylene, and polyvinyl chloride.

Because of the difficulties involved in extruding pure rubbers, and the fact that extrusion temperatures of 100–

120° C. cannot be exceeded, has resulted in the practice by the manufacturers of including large amounts of fillers such as kaolin or calcium carbonate in the rubber before it is extruded. These fillers remarkably reduce the electric properties of the original elastomer. For instance, use thereof results in a decrease in the volume resistivity, an increase in the dielectric constant and in the dielectric losses, a higher water absorption and a bigger chance of faults due to the imperfect distribution of the fillers in the sheath.

The use of plastic materials for the sheath does not raise particular extrusion problems, and the plastics mentioned can be extruded readily even without the use of fillers provided that the operation is carried out at sufficiently high temperatures. On the other hand, the thermoplasticity of the homopolymers mentioned is a serious inconvenience since, in case of short circuits of a given duration in which temperatures of 150° C. or higher can be reached in the conductor, the whole cable can be damaged due to the melting or high softening of the insulating sheath resulting in a displacement of the conductor. Moreover, the big cables normally are operated with working temperatures of 70–90° C., at which the plastics can begin to soften.

An attempt was made to avoid these difficulties in the case of polyethylene by cross-linking the insulating sheath with beta or gamma rays. However, that method involves the use of very expensive apparatus.

According to the present invention, the problem is eliminated because the insulating sheath of an electric cable can be obtained by extruding the elastomer in the absence of any filter, and at temperatures higher than those which can be used when vulcanizing agents are mixed with the elastomer before it is extruded.

Cables having the following characteristics:

Length _____ about 50 m.
Conductor section _____ 16 mm.².
Thickness of the insulating sheath _____ 5 mm.

were prepared according to the process of FIGURE 1 by extruding a mass consisting of a linear, amorphous ethylene-propylene copolymer as a sheath on the conductor. The extrusion temperature was about 200° C. The ethylene-propylene copolymer, due to its consistency and its permeability to gases, gave extruded articles which were particularly smooth, compact and free of blowholes.

As shown in FIGURE 1, immediately after extrusion of the copolymers sheath onto the conductor, the cables were immersed in water at 20° C. to cool them, and after being dried in an air stream (not shown), they were wound upon reels and then immersed in an acetone bath at 40° C. in which tetrachloro-tert. butyl peroxide (50 g. peroxide in 1 liter acetone) had been dissolved. The immersion time was 20 hours. The cables were then removed from the bath, dried in an oven at 40° C. under vacuum for about 2 hours, and were finally placed in an autoclave at 150° C. for 60 minutes for vulcanization of the copolymer.

At the end of the vulcanization the dielectric rigidity and the electric strength of the insulating sheath were determined according to ASTMD 470-58T with the following results:

Highest tension tolerated (volt) _____ 69,000
Highest electric field tolerated (volt/mm.) _____ 24,000
Electric strength (MΩ/km.) _____ 35,000
Electric resistivity (Ω/× cm.) _____ $2 \times 10^{16}$ Different mixtures of the copolymer with polyethylene, polypropylene, polyvinyl chloride and polystyrene were also extruded onto electric conductors to provide them with protective sheaths having good tensile strength. For instance, from mixtures of the copolymer with 30 parts by weight of polyethylene, insulating sheaths having a tensile strength of 70–75 kg./cm.² were obtained.

Very satisfactory cables were also prepared according to the aforementioned procedure by extruding onto the conductors, respectively, a linear, amorphous ethylene-butene copolymer, natural rubber, and a styrene-butadiene copolymer rubber as the protective insulating sheath.

Any resinous polymeric material having good electric insulating properties can be mixed with the copolymers to provide a protective sheath for the electric conductors and which is vulcanized after impregnation with the peroxide in situ on the conductor in accordance with our invention.

EXAMPLE 2

*Vulcanization of manufactured articles essentially consisting of polyethylene or polypropylene.*—Polyethylene and polypropylene can be vulcanized with the aid of organic peroxides. However, molding or extrusion of those polymers require such high temperatures that mixes containing the vulcanizing agent cannot be used successfully in those operations. The process of this invention makes is possible to extrude or mold the polyethylene or polypropylene to articles of the desired shape and then vulcanize the polymer in the shaped form to obtain the finished manufactured articles. However, if polyethylene or a relatively highly crystalline polypropylene is used, it is necessary to mix the homopolymer with a given amount of another linear ethylene-propylene copolymer, in order to insure that, in a relatively short time, a sufficient amount of the peroxide will be absorbed for a good result.

In the runs carried out by us it has been observed that, depending on the desired degree of cross-linking, 5 to 50 parts, preferably 20 to 40 parts of the copolymer per 100 parts polypropylene are sufficient.

From a mix containing 100 parts polyethylene and 30 parts of the copolymer electric cables, pipes of various size, containers of various types, and articles for medical services were prepared by shaping at the optimum temperatures for the particular mix. The vulcanization was carried out directly on the manufactured articles by the method described in Example 1. The articles thus vulcanized were placed for 10 hours in an oven at 150° C. and they all maintained their shape and consistency, acquiring elastic properties similar to those of rubber as a result of the vulcanization.

With a mix containing 100 parts of polypropylene and 40 parts of the ethylene-propylene copolymer various manufactured articles were prepared in a similar way. The articles were kept for 4 hours at 200° C. with results similar to those obtained with the polyethylene copolymer mixtures.

EXAMPLE 3

*Production of pipes or extruded articles in general.*— By a technique substantially similar to that described in Example 1, and using linear, amorphous ethylene-propylene copolymers as described hereinabove, in the absence of any filler, pipes and extruded articles of different shapes and sizes were prepared by extruding the copolymer at a temperature of 200° C.

Similar manufactured articles were also prepared from mixtures of the ethylene-propylene copolymers with variable amounts of carbon black or silica and sulfur using extrusion temperatures of 160 to 170° C.

The impregnation of the articles with the organic peroxide, and the vulcanization of the impregnated shaped articles were carried out as described above, with good results. Manufactured shaped articles of various types were similarly prepared from ethylene-butene copolymers, natural rubber, and styrene-butadiene copolymers.

EXAMPLE 4

*Roll milling and friction on fabrics with particularly hard mixes or on fabrics having a particularly thick weft.*—Techniques are known for spreading more or less thick layers of rubber mixes on fabrics by means of a calender comprising 3 or 4 rolls.

It is also known that when operating with very soft mixes or with fabrics having a highly scattered weft, a very good "wetting" of the yarns of the fabric can be obtained even at comparatively low temperatures.

When thick fabrics or hard mixes are used, however, there is the tendency to increase the friction ratio and the temperature of the rolls as much as possible in order to obtain a good peneration of the mix into the fabric.

In the conventional practice, the temperature used obviously cannot exceed the limits fixed by the vulcanizing agent contained in the mix and the friction ratios cannot be raised above certain limits.

Figure 2:
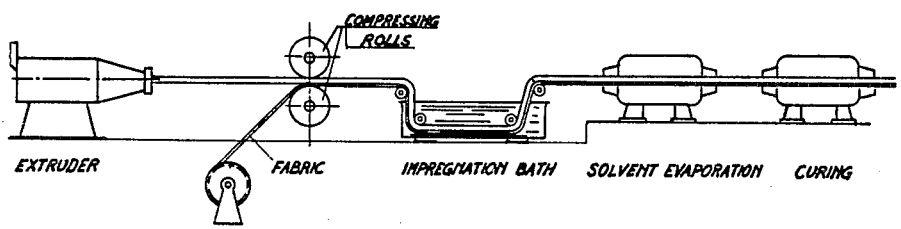

Using the method according to the present invention as shown in FIGURE 2, it is possible to prepare mixes free of vulcanizing agent, to roll them at very high temperatures, and to then add the vulcanizing agent (organic peroxide) by impregnation of the coated fabric in a subsequent operation. As an example of this embodiment of our invention, a mix consisting of linear, amorphous ethylene-propylene copolymer 100 parts, carbon black HAF 60 parts, sulfur 0.5 part was prepared.

This mix, which had a Mooney viscosity of 160 points at 100° C., was spread on a very compact cotton cloth (of the filter cloth type).

The operation was satisfactory only when the roll was heated to 160° C. At this temperature the mix was sufficiently fluid and penetrated the cloth weft thus forming a compact sheet which adhered to the fabric.

The treated cloth thus prepared was immersed in an acetone bath at 40° C. in which tetra-chloro tert. butyl peroxide (20 g. peroxide in 1 liter acetone) had been dissolved. The immersion time was one hour. The rubber-coated cloth was then dried in an oven under vacuum for about one hour and finally placed in an autoclave at 150° C. for 30 minutes for vulcanization of the copolymer.

The solubility was tested by placing samples (taken from various points of the cloth) in carbon tetrachloride at 30° C. for 24 hours. The maximum value of solubility was found to be 5%.

Hardness determinations were carried out with a microdurometer on the rubber layers; values varying from 60 and 62, i.e., good vulcanization indexes, were obtained.

EXAMPLE 5

*Production of yarns combining a high elastic elongation with an excellent rebound elasticity and a very good resistance to ageing.*—Highly elastic yarns have been prepared previously by cutting (by means of suitable machines) thin vulcanized rubber sheets into tapes having a width equal to the thickness of the sheet, or by spinning or coagulating in suitable baths filaments obtained from concentrated vulcanizable latexes.

The yarns obtained by these conventional methods from natural or synthetic polymers cannot be used under particular conditions and must always be protected with a sheath of more resistant years, wound on the core in a particular manner so as not to limit the elongations. These difficulties arise from the large surface area of the articles and the poor reseistance to ageing of the conventional natural and synthetic polymers. It is now possible, by the process of the present invention, to obtain elastic yarns having excellent mechanical, thermal, chemical and electric properties from saturated linear, amorphous copolymers of ethylene with propylene and copolymers with other vulcanizable polymers which mixtures consist essentially of the linear, amorphous copolymer.

The yarns are obtained by simply extruding the copolymer or mixture, impregnating the extruded article with the peroxide in solution, and then vulcanizing the impregnated article.

Substantial advantages of the process according to the invention can be listed as follows:

(a) The copolymers used as basis of the mixes have very good mechanical characteristics, more particularly very high tensile strength, exceptional resistance to light, heat, acids, basis, oxidants and ozone; and have, in addition, excellent electric characteristics.

These characteristics make it possible to use yarns produced in accordance with this invention under the most difficult conditions without requiring protective coatings or sheaths.

(b) the spinning of filaments can be carried out without the use of solvents which require the use of solvent recovery apparatus and unavoidable losses, and is, therefore, particularly economical.

(c) spinning mixes do not contain vulcanizing agents and are stable to heat up to and above 300° C. even for long times, thus making it possible to operate safely at the temperature corresponding to the vicosity most suitable for spinning filaments.

(d) the incorporation of the vulcanizing agents by diffusion thereof through the yarns after spinning thereof makes it possible to operate with peroxides of widely different kinds, without the need for selecting special vulcanizing agents which do not cause premature vulcanization during the spinning. The possibility of adding the vulcanizing agent to the formed yarn permits also the avoidance of imperfect vulcanization, due to loss of the vulcanizing agent.

It is also possible, according to our invention, to impregnate a previously partially vulcanized yarn (or other shaped article) with a solution of the peroxide, and thereafter heat the impregnated partially vulcanized yarn or the like to vulcanizing temperature in order to obtain a more highly vulcanized article.

Figure 3:
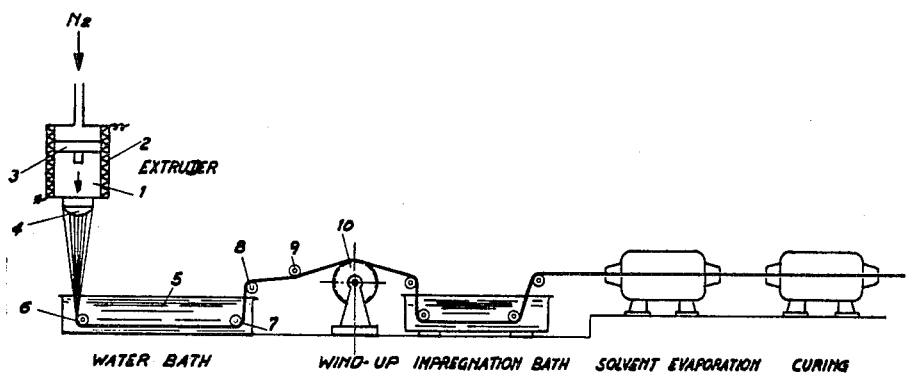

The spinning and vulcanization according to the invention are illustrated schematically in the accompanying FIGURE 3, in which 1 represents a cylindrical iron vessel provided with electrical heating means 2 and provided with a ram 3 which is actuated by a nitrogen pressure of 20 to 50 atoms. A cup spinneret 4 having 18 holes each having a diameter of 0.2 mm. and provided with a filtering net (not shown) of 13,000 mesh/cm.$^2$ supported by two other nets (not shown) of 900 mesh/cm.$^2$ and 1500 mesh/cm.$^2$, respectively, is secured by means of a ring nut (not shown) to the bottom of the vessel 1. The linear amorphous copolymer of ethylene with propylene and/or with butene-1 (or a mixture of the copolymer with fillers if such are used) and with or without the addition of sulfur to it but in the absence of any percompound, is introduced into the vessel 1 and heated to a temperature of 200 to 280° C. under nitrogen.

A constant volume of the heated, fluid copolymer is pumped to the spinneret 4 by a gear pump (not shown).

As shown, the spinneret is located directly over the vessel 5 containing a cooling water bath through which the filaments leaving the spinneret can pass, or they may pass through a chamber containing nitrogen (not shown) before they are passed through the impregnating solution of the peroxide. The yarn passes under rolls 6 and 7, over roll 8, under roll 9 and then to the wind up device 10. A quick cooling of the hot filaments leaving the spinneret is desirable in order to avoid or minimize surface oxidation of the filaments. If the filaments are cooled by passing them through cold water immediately after they leave the spinneret, the cooled and compact filaments can be dried before they enter the bath consisting of the peroxide solution.

The latter bath, consisting of the selected peroxide dissolved in a solvent therefor, and which is not a solvent for the filament, can also act as the cooling medium for the hot extruded filaments.

The impregnated yarn can be wound up in a centrifuge to obtain a yarn "cake" and then vulcanized by treating the cakes with steam in an autoclave.

In another modification, the vulcanization can be performed continuously by passing the yarn impregnated with the peroxide solution through a bath consisting of a molten metal alloy or mixture of alloys having a melting temperature of about 150° C., or by subjecting the running yarn to any other suitable continuous thermal treatment.

Using apparatus as shown in the drawing and described above, mixtures of varying composition were spun into filaments which were impregnated with a solution of an organic peroxide and subsequently vulcanized.

EXAMPLE 6

Spinning of linear, amorphous ethylene-propylene copolymers charged with carbon black and having sulfur incorporated therein.

The spinning mix had the following composition:

| | Parts |
|---|---|
| Ethylene-propylene copolymer (molecular weight 100,00–120,000) | 100 |
| Carbon black HAF (Kosmos 60) | 50 |
| Sulfur | 0.5 |

This mix was charged into vessel 1 and was pressed with the ram. The vessel was closed, connected with a nitrogen cylinder provided with a pressure-reducer and heated to 200–220° C.

The nitrogen pressure was regulated at about 30 atm. and the yarn leaving the spinneret was cooled by passing it through cold water contained in vessel 5 and was then wound onto the take-up reel 10.

The yarn was slightly tacky but the single filaments were separable from each other. The skein thus obtained was immersed in an impregnating bath at room temperature for one hour.

| | Parts |
|---|---|
| Acetone | 80 |
| Chlorinated tert. butyl peroxide | 20 |

The yarn thus treated was then vulcanized in an autoclave with steam under a pressure of 5 atm. for 30 minutes.

The vulcanized yarn had the following characteristics:

| Total count of the 18 filaments | 190 den. | 194 den. |
|---|---|---|
| Tenacity, g./den | 0.18 | 0.16 |
| Elongation at break, percent | 420/470 | 420/450 |
| Permanent elongation after stretching at 200% for 1 hour and a rest for 1 minute, percent | 8 | 7 |

EXAMPLE 7

Spinning and vulcanization of mixes containing 20% polypropylene.

The spinning mix consisted of:

| | Parts |
|---|---|
| Ethylene-propylene copolymer | 100 |
| Polypropylene | 20 |
| Sulfur | 0.5 |

This mix was charged and spun with the apparatus and modalities already described except that the nitrogen pressure was regulated depending on the desired extrusion rate for each run.

The yarn, after being cooled by passage through cold water contained in vessel 5, was collected on the reel 10, and subsequently immersed for one hour in the impregnating bath described in Example 6. After vulcanization in an autoclave under 5 atm. for 30 minutes, the yarn had the following characteristics:

| Total count of the 18 filaments | 185 | 205 |
|---|---|---|
| Tenacity, g./den | 0.09 | 0.07 |
| Elongation at break, percent | 220/320 | 170/290 |
| Permanent elongation, percent | 15–17 | 16–20 |

*Test of resistance to ageing carried out on yarns produced according to Examples 6 and 7.*—As is apparent from Examples 6 and 7, the yarns did not comprise extraneous agents for increasing the resistance of the polymeric material to ageing.

(a) the yarns produced in Examples 6 and 7 were immersed in cold 68% nitric acid for 30 days; after said treatment the characteristics of the yarns compared with those before the nitric acid treatment, were as follows:

*Yarns produced in Example 6*

| | Before the treatment in $HNO_3$ | After treatment in $HNO_3$ for 30 days |
|---|---|---|
| Total count of the 18 filaments | 190 den. | 195 den. |
| Tenacity, g./den | 0.18 | 0.1 |
| Elongation at break, percent | 450 | 520 |
| Permanent elongation, percent | 8 | 14 |

*Yarns produced in Example 7*

| | Before the treatment in $HNO_3$ | after treatment in $HNO_3$ |
|---|---|---|
| Count of the 18 filaments | 185 | 190 |
| Tenacity, g./den | 0.09 | 0.05 |
| Elongation at break, percent | 220/320 | 350 |
| Permanent elongation, percent | 17 | 25 |

(b) The yarns produced in Examples 6 and 7 were immersed in cold 98% sulfuric acid for 30 days; after this treatment the characteristics, compared with those of the untreated yarns, were as follows:

*Yarns produced in Example 6*

| | Before treatment with $H_2SO_4$ | After treatment with $H_2SO_4$ |
|---|---|---|
| Total count of the 18 filaments | 190 | 192 |
| Tenacity, g./den | 0.18 | 0.12 |
| Elongation at break, percent | 450 | 320 |
| Permanent elongation, percent | 8 | 12 |

*Yarns produced in Example 7*

| | | |
|---|---|---|
| Total count of the filaments | 188 | 192 |
| Tenacity, g./den | 0.09 | 0.055 |
| Elongation at break, percent | 220/320 | 190 |
| Permanent elongation, percent | 17 | 22 |

(c) the yarns produced as described in Examples 6 and 7 were placed in a vented oven at 100° C. for 8 days.

The characteristics after this treatment were as follows:

*Yarns produced in Example 6*

| | Before the heat treatment | After the heat treatment |
|---|---|---|
| Total count of the 18 filaments deniers | 190 | 185 |
| Tenacity, g./den | 0.18 | 0.12 |
| Elongation at break, percent | 420/470 | 420 |
| Permanent elongation, percent | 8 | 12 |

*Yarns produced in Example 7*

| | Before the heat treatment | After the heat treatment |
|---|---|---|
| Total count of the 18 filaments deniers | 185 | 180 |
| Tenacity, g./den | 0.09 | 0.06 |
| Elongation at break, percent | 420/470 | 420 |
| Permanent elongation, percent | 8 | 12 |

(d) The yarns produced in Examples 6 and 7 were placed 30 cm. away from a 100 watt ultra-violet lamp provided with a reflecting mirror; the yarns were exposed to the radiations for 48 hours.

Their characteristics are reported in the following tables:

*Yarns produced in Example 6*

| | Before exposure to ultra-violet light | After exposure to ultra-violet light for 48 hours |
|---|---|---|
| Total count of the 18 filaments | 190 | 190 |
| Tenacity, g./den | 0.18 | 0.11 |
| Elongation at break, percent | 420/470 | 470 |
| Permanent elongation, percent | 8 | 14 |

*Yarns produced in Example 7*

| | Before exposure to ultra-violet light | After exposure to ultra-violet light for 48 hours |
|---|---|---|
| Total count of the 18 filaments | 185 | 180 |
| Tenacity, g./den | 0.09 | 0.06 |
| Elongation at break, percent | 220/320 | 250 |
| Permanent elongation, percent | 15/17 | 20 |

EXAMPLE 8

A mix of 80 parts of a linear, amorphous ethylene-butene copolymer (molar ratio of the starting monomers 60/40) with 20 parts polyethylene (grade 10) was prepared.

This mix was extruded at the temperature of about 190° C. onto an electric conductor having a diameter of 4 mm. to obtain a cable comprising an insulating sheath of the copolymer and which had a thickness of 2 mm.

Immediately after extrusion of the copolymer onto the conductor, the cable was immersed in water at 20° C. to cool it, was then dried with an air stream, wound upon a reel, and immersed in a bath maintained at 40° C. and consisting of an acetone solution of chlorinated di-tert. butyl peroxide (50 g. peroxide per liter of acetone).

The immersion time was 12 hours; the cable was then dried in an oven at 40° C. under vacuum for about 1 hour and finally placed in an autoclave at 150° C. for 40 minutes in order to vulcanize the copolymer.

After vulcanization, the electric properties of the insulating sheath were measured with the following results (ASTM-D470-58T):

Maximum voltage tolerated (volts) _____ 32,000
Maximum electric field tolerated (volt/mm.) ___ 23,000
Electric strength (M Ω km.) _____ 16,000
Electric resistivity (Ω×cm.) _____ $1.5 \times 10^{-16}$ The insulating sheath, separated from the conductor, was subjected to mechanical tests (ASTM D 412-51T) with the following results:

Tensile strength (kg./cm.²) _____ 64
Elongation at break (%) _____ 650
Modulus at 300% (kg./cm.²) _____ 23

Similar very satisfactory cables were produced, also, by extruding onto the electric conductors a mixture of the ethylene-butene copolymer with 10 to 20% of polypropylene, impregnating the sheath with a peroxide solution, and then effecting the vulcanization.

The linear, amorphous copolymers of ethylene with an alpha-olefin $CH_2=CHR$ where R is hydrocarbon, such as the linear amorphous copolymers of ethylene with propylene and/or with butene-1, which are used in practicing the present invention are substantially free of homopolymers of the starting monomers and are described in detail, together with processes for obtaining them, in the pending application of Natta et al. Ser. No. 629,085 filed December 18, 1956.

As shown herein, the material which is formed into the manufactured shaped article to be impregnated with the peroxide and thereafter vulcanized may comprise a mixture of the copolymer with polyethylene or polypropylene.

The polypropylene used in the mixture is a linear, regular head-to-tail polypropylene according to Natta et al., which may comprise the isotactic structure and exhibit crystallinity at the X-rays, or which may be amorphous and made up of linear, regular head-to-tail atactic macromolecules.

In mixtures of the linear, amorphouse copolymers with other polymers, the copolymer should be present in an amount of at least 40% by weight on the weight of the mix. In the presently preferred embodiments, the polymeric component of the mix consists of or consists predominantly (over 60%) of a linear amorphous copolymer of ethylene with propylene and/or butene-1, according to Natta et al.

The examples given demonstrate conclusively the unexpected advantages obtained as a result of the absence of fillers and vulcanizing agents from the rubbery materials during extrusion thereof, and the postponement of the incorporation of the vulcanizing adjuvant in the rubbery materials until after the latter have been extruded or otherwise molded into manufactured articles of the predetermined desired shape and size.

Since it is apparent that various changes can be made in details in practicing this invention without departing from the spirit thereof, we intend to include in the appended claims all such variations and modifications of our invention as may be apparent to those skilled in the art from the description and examples given herein.

What is claimed is:

1. A process for obtaining vulcanized manufactured shaped articles comprising an elastomeric, amorphous copolymer of ethylene and a higher alpha-olefin selected from the group consisting of propylene and butene-1, which copolymer contains from about 40 mol percent to about 65 mol percent of the higher alpha-olefin in the macromolecule, has a molecular weight of from about 50,000 to about 500,000, and is vulcanizable with the aid of organic peroxides, said process consisting of the steps of impregnating the article with a solution of an organic peroxide in a solvent therefor which does not swell the copolymer and in which the concentration of the organic peroxide is from about 20 grams to about 100 grams per liter of the solvent, to effect diffusion of the organic peroxide in the article prior to vulcanization, and heating the impregnated article at a vulcanizing temperature between 180° C. and 230° C.

2. The process according to claim 1, further characterized in that the manufactured shaped article comprises the elastomeric amorphous copolymer in admixture with polyethylene.

3. The process according to claim 1, further characterized in that the manufactured shaped article comprises the elastomeric amorphous copolymer in admixture with linear, regularly head-to-tail amorphous polypropylene.

4. The process according to claim 1, further characterized in that the manufactured shaped article comprises the elastomeric amorphous copolymer in admixture with polypropylene having the stereoregular structure isotactic and exhibiting crystallinity at the X-rays.

(References on following page)

References Cited by the Examiner

UNITED STATES PATENTS

| | | | |
|---|---|---|---|
| 1,716,215 | 6/29 | Dunlap | 161—172 |
| 2,246,822 | 6/41 | Van Rossen | 264—340 |
| 2,407,061 | 9/46 | Dahle | 264—340 |
| 2,432,603 | 12/47 | Zink | 174—110 |
| 2,628,214 | 2/53 | Pinkney et al. | 18—54 |
| 2,802,897 | 8/57 | Hurd et al. | 175—110 |
| 2,953,839 | 9/60 | Kohrn et al. | 18—57 |
| 3,038,236 | 6/62 | Breen | 161—172 |

OTHER REFERENCES

Pages 73, 74; (1954) Organic Peroxides, Interscience Publishers Inc., New York, Tobolsky et al.

ALEXANDER H. BRODMERKEL, *Primary Examiner.*

MICHAEL V. BRINDISI, WILLIAM J. STEPHENSON, MORRIS LIEBMAN, *Examiners.*